Nov. 10, 1970  D. D. WOODBRIDGE ET AL  3,539,507

WASTE TREATMENT PROCESS

Filed Oct. 31, 1968

David D. Woodbridge
Thomas A. Nevin
William R. Garrett
INVENTORS

BY

William M. Hobby
Attorneys

David D. Woodbridge
Thomas A. Nevin
William R. Garrett
INVENTORS

BY William M. Hobby
Attorneys

United States Patent Office 3,539,507
Patented Nov. 10, 1970

3,539,507
WASTE TREATMENT PROCESS
David D. Woodbridge, Eau Gallie, Thomas A. Nevin, Indian Harbor Beach, and William R. Garrett, Melbourne, Fla., assignors to Energy Systems, Inc., Melbourne, Fla., a corporation of Florida
Filed Oct. 31, 1968, Ser. No. 772,288
Int. Cl. C02c 5/06
U.S. Cl. 210—8    5 Claims

ABSTRACT OF THE DISCLOSURE

A waste treatment process for treating liquid waste such as raw sewage, and the like, and including continuous biochemical treatment of liquid waste in tanks. Mixing of the waste is performed in a mixing container prior to pumping it into the treatment tanks. A continuous feedback of a portion of the biochemically treated waste to the mixing container keeps the biochemical treatment tanks operating even during lull periods. Filtration and sterilization is also provided for in the process.

BACKGROUND OF THE INVENTION

Field of the invention

The present invention relates to waste disposal and more particularly to a method for disposing of liquid waste in which a high degree of treatment is obtained in an economical manner.

Areas having any degree of population concentration face the problem of disposing of water carried wastes from residences and commercial businesses and from industries which have liquid waste. Purification must be obtained to a degree which will prevent injury to the health and welfare of mankind. Physical, chemical and biological processes that take place in nature have been heavily relied upon in the past to complete the treatment of partially treated sewage that is discharged into rivers, lakes, oceans, and the like. However, many of the same sources of water are used by many different population centers and the same water sources must be used to provide a source for the population water supply. In addition to the direct pollution of the partially treated sewage into bodies of water, additional pollution results from depriving animal and vegetable life of oxygen in certain types of pollution or an overgrowth of weeds and undesirable blooms in unicellular algae as a result of the added nutrients entering the water. These nutrients include killed microorganisms and undigested sludge, as well as the dissolved minerals such as nitrates and phosphate which are especially important to the growth of the algae and weeds.

Description of the prior art

In the past waste disposal such as sewage has been by a primary treatment for removal of the grosser solids and then by a secondary treatment to further remove and to change the form of dissolved and colloidal organic matter to prevent odor and other nuisances.

Typically, raw sewage is screened to remove rags, pieces of wood and sizable material to prevent damage to pumps, and the like. Such screens are usually spaced bars with predetermined openings with provision for regular cleaning. Following the screening, materials such as sand and grit are removed to avoid wear on the pump surfaces. Grit may be separated by the regulation of velocity of flow so that fast settling grit will be deposited while the lighter solids will be carried on. The grit may be washed and used for fill dirt, and the like.

The next step is usually to remove suspended solids by sedimentation in tanks. This may be done very rapidly with a continuous flow of sewage into tanks designed to minimize currents that would interfere with sedimentation. The removed solids at this point must be disposed of which may be done by further drying and burning in an incinerator. Cities on large rivers frequently end their treatment with the primary sedimentation and chlorination of the remaining effluent and discharge into the river. However, chemical coagulation to remove colloidal solids by coagulation of the solids into a size that will settle and then settling in a settling tank is usually desirable. This is performed by the addition of coagulative chemicals such as ferric chloride, ferrous sulfate or aluminum sulfate, and mixing such chemical with the effluent prior to the effluent entering a settling tank.

At this point the effluent contains a substantial amount of dissolved and colloidal matter that will decompose under the proper conditions. Secondary treatment generally utilizes one of the following methods: Trickling filters, activated-sludge, or sand filters. Trickling filters are beds of 2–4 inch stones, or the like, in which the effluent is applied, such as in a spray. Purification results from the action of a film of bacterial slime on the stones. Following the filtration, the effluent is resettled.

Sand filters utilize beds of fine sand to pass the effluent through, and must be backwashed periodically. The activated sludge method is accomplished by mixing biochemically active sludge to the influent and agitating with a supply of air for aeration. The effluent is then allowed to settle. Other methods becoming more common include anaerobic digestion, and lagooning. Lagooning uses large holdings basins and digestion may be accomplished aerobically or anaerobically such as by decomposing the waste material by anaerobic biological degradation. Aerobic treatment uses aerobic bacteria in the presence of dissolved molecular oxygen.

Many advanced waste treatment processes have been suggested and these include absorption techniques such as passing the effluent over activated carbon, ammonia stripping for removing ammoniacal compounds, biodenitrification for removing nitrates, and biological phosphate removal for removal of phosphates, removal of these last two nutrients being important in preventing contamination of surface water by excess growth of weeds and algae. These are in addition to the coagulation, disinfection, such as by chlorine, filtration, and the like, already mentioned.

Finally, it has been suggested to sterilize the treated effluent by a series of sterilizers using elevated temperatures to provide potable water. Also suggested has been piping the effluent a great distance out into the ocean and one suggested method would mix excrement from pregnant cows in a process to improve the treatment of waste.

SUMMARY OF THE INVENTION

The present invention relates to a method for treating liquid and suspended wastes, and in particular to a sewage treating process.

The wastes are fed into a wet well or mixing container and pumped from the wet well into biochemical treatment vats, which may be charged with a specific culture of yeasts and any needed nutrients and minerals for optimum growth of the yeast. The treated wastes next pass into a second set of biochemical vats, which may be the same as or modifications of the first for additional treatment. The liquid leaving the second vats may be filtered prior to entering a junction box where a portion thereof is fed back to the mixing container to keep the waste in the well stirred up and to provide continuous operation so that lull periods will not inactivate the culture charge in the biochemical treatment vats. A portion of the liquid after filtration, is fed from the junction box through a sterilizer such as a gamma radiation sterilizer for killing off harmful bacteria and other microorganisms. The liquid is filtered again and discharged as desired.

BRIEF DESCRIPTION OF THE DRAWINGS

Other objects, features, and advantages of this invention will be apparent from a study of the written description and the drawings in which.

DESCRIPTION OF THE PREFERRED EMBODIMENT

Figure 1:
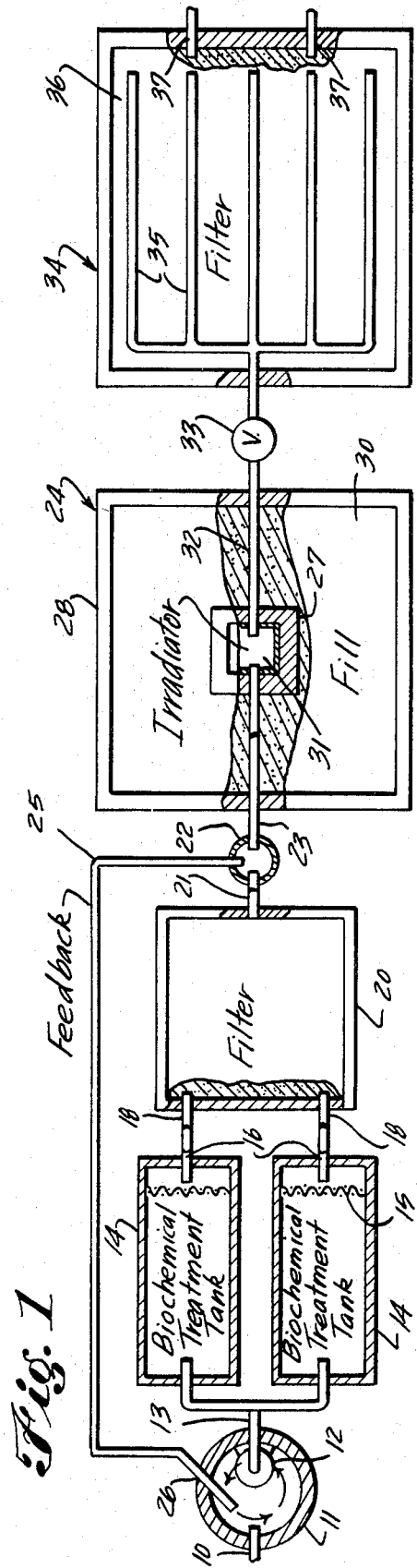
FIG. 1 is a top flow diagram of a preferred embodiment of the present invention.

Referring now to FIG. 1 of the drawings, a flow diagram is shown having an input 10 which delivers raw sewage or other liquid waste to a mixing container 11. A pump 12 pumps the liquid waste from the well 11 through pipes 13 into tanks 14. Tanks 14 are biochemical treatment tanks and operate on the principle of charging with specific cultures of microbiological agents in which the medium of sewage has been adjusted for optimum growth of the culture and for the digestion or otherwise converting and treating of the raw sewage. In particular it has been found through our experiments that certain species of yeasts are particularly effective in digesting a great portion of the solids in raw sewage while requiring a minimum of adjustments to the medium. By yeasts we mean that group of unicellular fungi having spherical, ovoid or rod-shaped vegetative body. In the past, it has been common to use certain species of yeast for growth in artificial media for the production of vitamins, proteins, and other nutrilites by the action of concentrating these from the medium and the concentrating of the yeast by centrifugation, or the like. Yeasts have also been used in the production of such products as fermented beverages, baking, alcohol, enzymes and glycerol. For each process a definite species of yeast is utilized for optimal results with the medium frequently being a by-product of another industry. The medium will frequently require carbohydrates, as well as sources of nitrogen, phosphorous and potassium, of which these last are commonly found in raw sewage in sufficient quantities as not to require additions for digestion of the solids by the yeast.

Our experiments have shown that even common strains of yeast such as *Saccharomyces cerevisiae* are effective in digestion of raw sewage with only the addition of small amounts of carbohydrates. The use of yeast has produced an effluent without the usual unpleasant odors or noxious gases usually found in these processes.

Tanks 14 have screens 15 to prevent larger solids from passing any further through the system. The partially treated sewage passes from the bottom of tanks 14 through pipes 16, which pipes run upward before making a U turn in order to maintain the level of waste in the tank. Pipes 16 enter into a second set or stage of biochemical treatment tanks 17 (FIG. 2 and FIG. 3) which may use the same or a different type of biochemical action for further treatment of the effluent. The treated effluent passing from the bottom of tanks 17 through pipes 18, which are similar to pipes 16 and enter filter 20 which may be a sand type filter having layers of gravel of various coarseness for filtration of the effluent. The filtered effluent passes out of filter 20 through a pipe 21 located above the sand in the filter into a junction box 22. The normal flow is from junction box 22 through pipe 23 into the radiation sterilizer 24. However, at a lower level in box 22 is a feedback pipe 25 which will keep effluent feeding back to well 11 even when junction box 22 does not have sufficient effluent to continue the flow out pipe 23. Feedback pipe 25 advantageously keeps the system from the well 11 through the treatment tanks 14 and 17 and filter 20 in constant operation even during lull periods when the input 10 has minimal or no input. This prevents loss of the culture charge in the tanks 14 and 17. Feedback line 25 has an output or nozzle 26 arranged to keep the liquid in well 11 in a constant circular motion which mixes and breaks up the solids in the liquid for better operation of the system.

The effluent passing from the junction box 22 is fed through a sterilizer 24 which is surrounded with dirt or concrete fill, or the like, which acts as a radiation barrier. The center core 27 may be concrete, as may the wall 28 with fill dirt 30 in between. The irradiator is located at 31 and may be the same as described in copending patent application No. 690,475, filed Dec. 14, 1967, for Radiation Treatment Method and Apparatus for Decontamination of Polluted Fluid. That invention advantageously passes all effluent between parallel plates of gamma radiation which parallel plates provide a uniform field of radiation therebetween to give a more substantial kill of bacteria, and the like. It should, however, be clear that other radiation sterilizers may be used, especially in the case where a system is desired for easy loading of a core, without departing from the spirit and scope of the invention. It should be noted that pipe 23 entering the sterilizer 24 takes a bend to avoid escape of any radiation from the sterilizer. The sterilized effluent passes out pipe 32 and through a valve 33 into a second filter 34. Valve 33 is used to backwash the sterilizer 24 as needed. Filter 34 has multiple lines 35 feeding onto a sand or gravel bed with exit or outputs 37.

Figure 2:
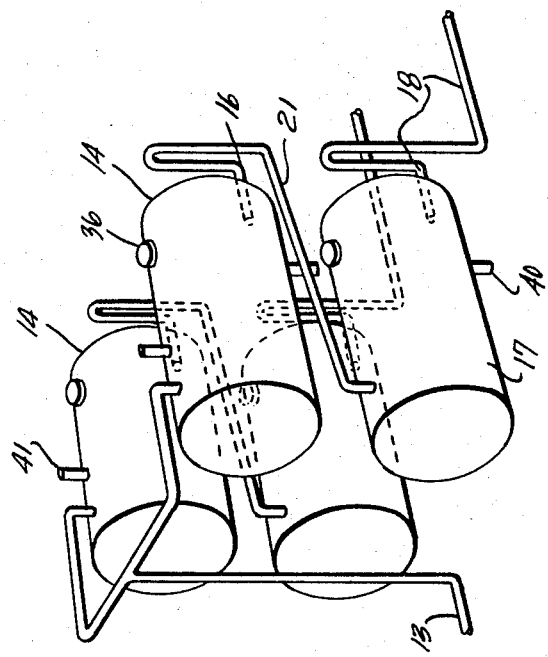
FIG. 2 illustrates biochemical treatment tanks in perspective.

With reference to FIG. 2, a representation of tanks 14 and 17 can be seen to illustrate the location of the tanks with respect to each other and to the pipes 21 but not necessarily to indicate any preferred shape or size. Pipe lines 16 and 18 may also be viewed. It should also be noted that the tanks 14 and 17 have means of entering 38 and means 40 for draining off collection at the bottom of the tanks. Vents 41 are also necessary for proper operation to allow entrance of oxygen, and the like.

Figure 3:
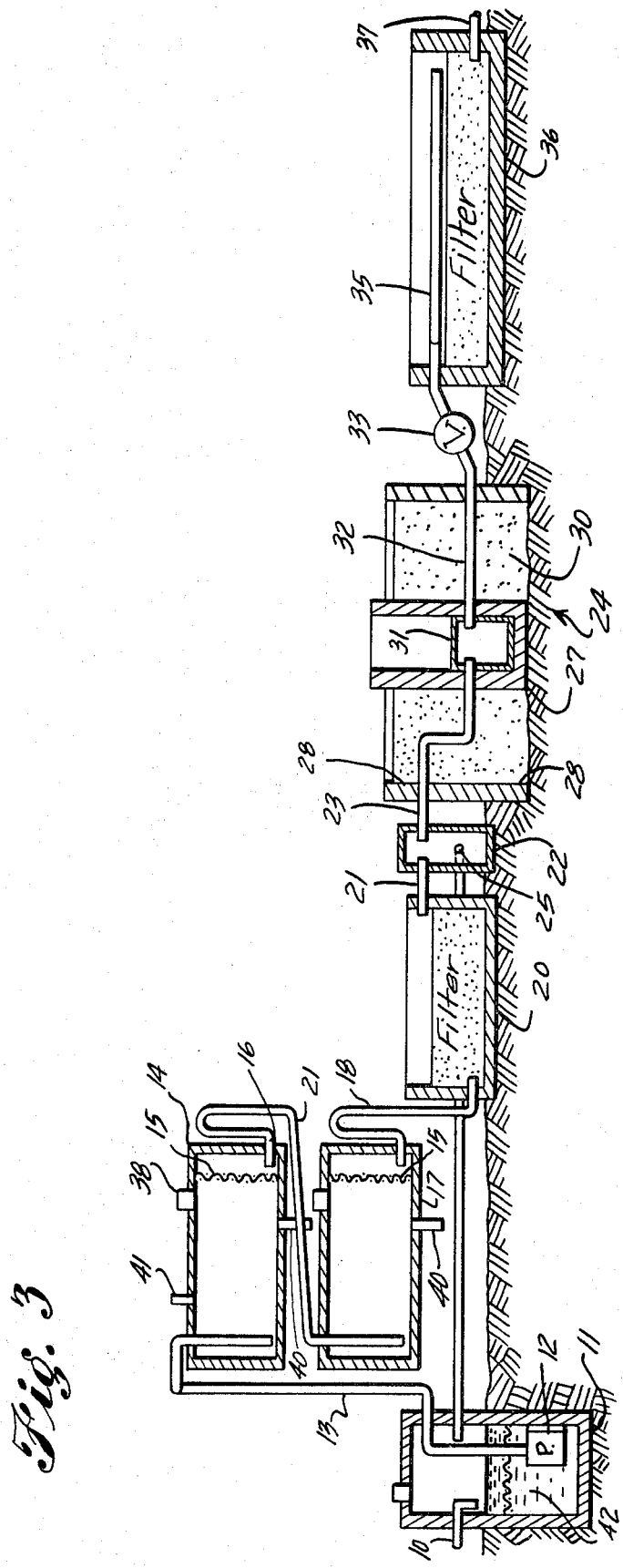
FIG. 3 shows a side flow diagram of the embodiment of FIG. 1.

FIG. 3 illustrates a flow diagram from the side with input 10, pump 12, well or mixer 11 and line 13. A screen 42 in the well 11 prevents larger solids from interfering with the operation of the pump until they are sufficiently broken down. The pump 12 works on the same principle as a sump pump in that it pumps only when the liquid in the well 11 reaches a predetermined point. Alternatively, the pump may operate continuously. Following the pumping operation, the system may be gravity operated for the remainder of the processing. Tanks 14 have vents 41, entrances 38, screens 15, drains 40 and output pipes 21 which run into tanks 17 which also has screens 15 and drains 40, and an exit 18, feeding the output to the filter 20. Filter 20 feeds junction box 22 through pipe line 21 with exits pipe 23 and feedback pipe 25 connected at a point lower than pipes 21 and 23. Sterilizer 24 has walls 28, fill 30, inner walls 27 and a radiation core 31 and exit pipe 32. A valve 33 allows backwashing of the radiation sterilizer 24 if desired and pipes 35 distribute the liquid over sand 36 in sand filter 34. The effluent may then be discharged at 37 at any place desired without polluting the surrounding area.

As can be clearly seen by those skilled in the art, a waste treatment method has been provided in which liquid wastes are fed into a well 11 prior to passing it to a plurality of biochemical treatment vats 14 and 17, especially adapted for yeast degredation or consumption. Feeding back a portion of the treated effluent advantageously prevents loss of a culture charge in the vats while mixing and breaking up large solids in the liquid waste. The treated liquid is filtered before sterilization to prevent clogging of the sterilizer and after sterilization to remove killed bacteria, and the like. It should be clear, however, that the inventors do not contemplate being limited to the particular forms disclosed herein and contemplate such changes as operating the feedback from a point other than following the first filteration, or using a different number or stages of treatment tanks. Also, the type of core for the radiation sterilizer is to be the subject of another application, even though any number of designs of radiation sterilizers might be used, such as the one mentioned in a copending application.

This invention is not to be construed as limited to the particular forms disclosed herein, since these are to be regarded as illustrative rather than restrictive.

We claim:
1. A waste treatment method comprising the steps of:
 (a) discharging liquid waste into a blending container;
 (b) pumping said waste from said blending container into at least one biochemical treatment tank;
 (c) biochemically treating said waste in said treatment tanks;
 (d) filtering the effluent from said biochemical treatment tanks;
 (e) feeding back a sufficient portion of the output of said filtered biochemical treated effluent to said blending container to provide a continuous flow through said treatment tank during lulls in the input of waste; said feedback effluent being directed into said blending container in a manner to blend said discharging waste;
 (f) irradiating the remaining output of said biochemical treatment tank with gamma radiation; and
 (g) discharging the irradiated effluent.

2. The method according to claim 1 but including filtering said effluent following the step of irradiating said waste.

3. The method according to claim 2 in which the step of biochemically treating said waste includes a plurality of stages.

4. The method according to claim 3 in which said stages are performed in a plurality of biochemical treatment tanks.

5. The method according to claim 4 in which said steps of biochemically treating effluent includes degradation by yeast.

References Cited

UNITED STATES PATENTS

| | | | |
|---|---|---|---|
| 1,633,079 | 6/1927 | Engle | 210—151 X |
| 2,529,295 | 11/1950 | Hood | 210—8 X |
| 2,686,146 | 8/1954 | Buswell et al. | 210—11 X |
| 3,431,200 | 3/1969 | Davis et al. | 210—10 |

J. L. DeCESARE, Primary Examiner

U.S. Cl. X.R.

210—64, 203